April 21, 1925.
H. BESSER
1,534,353
FRACTURED BLOCK AND METHOD OF MAKING THE SAME
Filed April 19, 1923    2 Sheets-Sheet 1
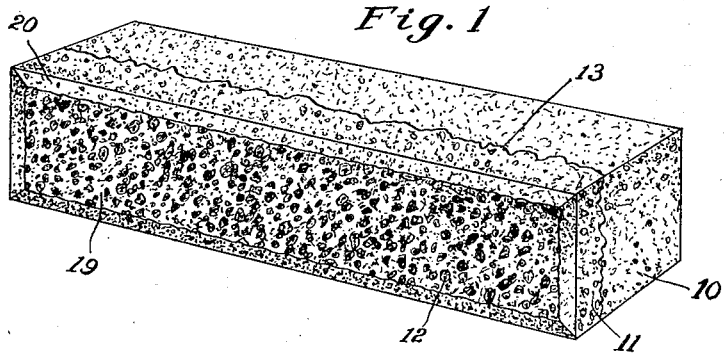
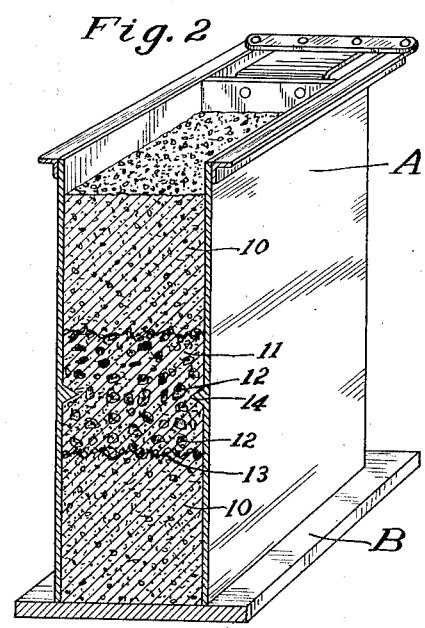
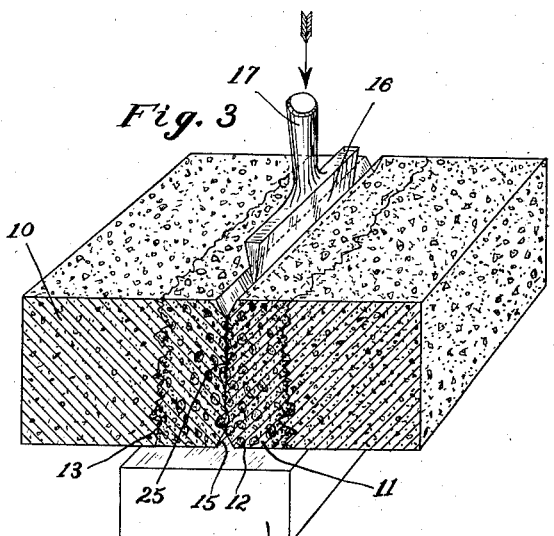
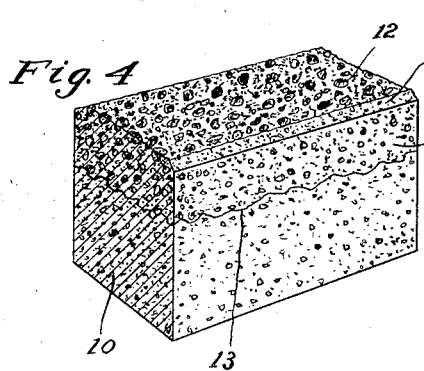
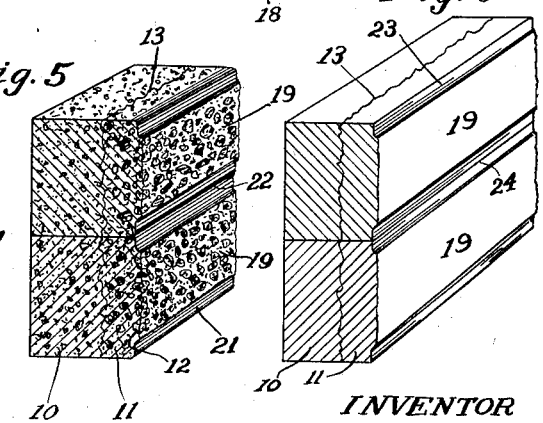
INVENTOR
Herman Besser
By Gray and Lilly
ATTORNEYS April 21, 1925.                                                                      1,534,353
H. BESSER
FRACTURED BLOCK AND METHOD OF MAKING THE SAME
Filed April 19, 1923        2 Sheets-Sheet 2

INVENTOR
Herman Besser
BY Gray and Lilly
ATTORNEYS

Patented Apr. 21, 1925.

1,534,353

UNITED STATES PATENT OFFICE.

HERMAN BESSER, OF ALPENA, MICHIGAN.

FRACTURED BLOCK AND METHOD OF MAKING THE SAME.

Application filed April 19, 1923. Serial No. 633,106.

*To all whom it may concern:*

Be it known that I, HERMAN BESSER, a resident of the city of Alpena, county of Alpena, and State of Michigan, and a citizen of the United States of America, have invented certain new and useful Improvements in Fractured Blocks and Methods of Making the Same, of which the following is a specification.

My invention relates to artificial building blocks of an especially ornamental character, and the method of making the same. It relates particularly to fractured blocks presenting a highly ornamental surface. My blocks are to be molded from concrete material or some composition containing concrete, by which I mean a cement mixture of earthy materials.

It is an object of my invention to make building blocks having a thick facing of highly ornamental material which has resulted from fracture of a thicker molded layer, and a main or rear portion or layer of concrete of the usual composition for such blocks. In any case, the blocks are to be made up of layers or strata of quite different composition or mixture.

It is a further object of my invention to make artificial blocks of molded material in strata of different compositions, certain of which have a richness of cement lower than that of the others whereby the block unit may be fractured when hard and yet positively direct the plane of fracture in the weaker strata.

Another object of the invention is to effect the operation of fracturing the layer after the complete "setting" in the molded form. This is regarded as very important since it gives to the fractured surface or face an ornamental appearance not heretofore attained to my knowledge. Fracture of such molded blocks has generally been done while "green", as this was thought necessary to direct the line of fracture where intended.

It is an especial object of my invention to incorporate in one or more strata of a molded mass small bodies by mixing together such bodies as pebbles or pieces of crushed granite or marble with the usual cement and water, the bodies used having a weaker cohesive force than the adhesive force between the same and the surrounding concrete, and fracturing the resulting layer after "curing" thereby splitting the said bodies of the mixture lying in the plane of fracture, thus presenting a fractured surface on the block having split pebbles or other small bodies with clean unspotted faces.

With these and other objects of my invention described in the accompanying pages and illustrated in the drawings herein referred to and pointed out in the appended claims, more detailed description of the method disclosed, including the various steps used, and the resulting product will now be revealed.

In the drawings illustrating my invention,—

Figure 1 is a perspective view of a completed block made by my method;

Figure 2 is a perspective of a portion of a block mold filled with plastic material in the manner I propose using, a vertical, transverse section being shown through mold and contents;

Figure 3 is a perspective of the molded block as removed from the position shown in Fig. 2, and as the operation of fracturing is being performed;

Figure 4 shows a perspective view of part of the block after fracture, the fractured face being the upper surface in this view;

Figure 5 is a perspective view of two blocks of modified form, though designed to be made by my method herein described;

Figure 6 is a view similar to Fig. 5, of a second modification;

Figure 7:
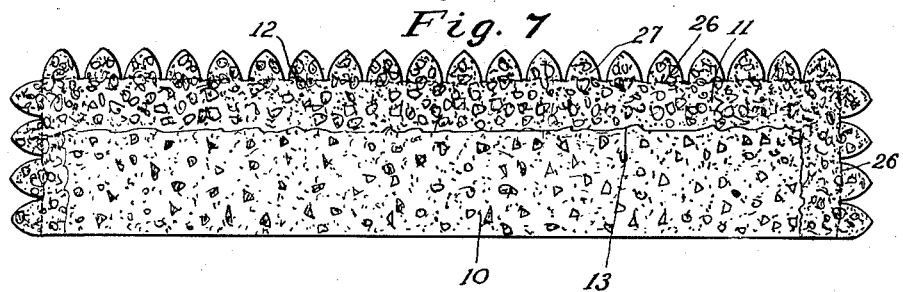
Figure 7 is a plan view of a block after molding, but before fracture, this view showing a further modification.

My method of manufacture is designed to form a block of different forms of material, and especially of more than one quality of material, one of which shall be of particularly ornamental character and shall, by making according to my method, expose to the external surface of a wall in which such blocks are laid, a fractured surface of the especially ornamental material, and one in which small stones of rare beauty shall have been split in the general plane of fracture thereby exposing a jeweled surface of great brilliance, and not to my knowledge attained by methods heretofore used. One great weakness in the fracturing step of block manufacture heretofore used was the practice of producing fracture while the block was still green, at least not fully hardened. The result could never therefore have the beauty and especially the brilliance of surfaces which could be attained by fracture of fully hardened material which had been cured before fracture.

To accomplish the desired result and produce the effect designed artificially, it is necessary to mold the material with care, and it is my purpose to mold a block of larger depth than the final product, so that the plane of fracture shall be transverse of the depth of the mold as here shown in the molding view. In my first form of embodiment of my invention, a deep mold A is set up (but one end of the mold being shown in the view in Fig. 2), here shown as supported on the usual form of pallet B. Concrete material is then poured into and tamped down in the bottom of the mold to a height equal to about one third the depth of the mold. Then an entirely different character of material from that at the bottom is poured in upon the first layer. Marble or granite in suitable mixture with concrete has been found by me very suitable for the purpose of this intermediate layer, it being found in various colors and having therein many small pebbles of the approximate size of peas or even larger, some being brown, or even fiery red, while others are gray and bluish or of a purple shade. In some cases it may be found advisable to crush marble or granite of the desired shade to the desired size of particles in a stone crusher, and such particles resulting from said crushing are intended to be included in the terms "pebbles" and "bodies" hereafter used in this description of method. The composition of this intermediate layer in molding the original block, if three layers are used, is of a concrete rich in cement which holds embedded therein the solid bodies—the pebbles before referred to. In the drawings the numeral 10 represents the concrete layers both in the mold and in the finished product; 11 designates the intermediate layer of the mixed concrete and granite composition, the pebbles or solid bodies bound therein being designated by 12.

Care is taken in molding all these materials to make the concrete layers 10 of the most durable character, so that the cohesive force thereof will be the maximum possible. Further, the line of division 13 between layers 10 and 11 is purposely made irregular so that the demarcation line shall not present too abrupt a line of cleavage in material that might possibly be weaker in adhesive force than the cohesion in the layer 11. It is quite essential that these layers shall be gradually united, one fading into the other, so that when fracture occurs, it will not follow line 13.

It is also important that the adhesive force of the layer 11 shall be made very strong, in fact, after curing these blocks prior to fracture, it is possible to attain a strength of adhesion between the pebbles and the concrete in which they are imbedded in this layer 11 that is even greater than the cohesive force of the particles in bodies 12 before referred to. Such strength of adhesion can only be attained by using a composition sufficiently rich in cement and by a longer period of remaining in molded form undisturbed. This step of hardening or curing prior to fracture I regard as very important and cannot be too strongly emphasized.

When, now, the block has fully "set," it is then fractured along the line 25, resulting in two blocks, if the first form of molding is used, each having a deep concrete base and a shallower granite layer presenting a fractured face having split pebbles thereon for the wall surface. The cohesive force in the pebbles being weaker than the adhesion between the pebbles and the binding agent or concrete, a splitting or breaking force directed transverse to the granite part of the block will cause fracture along the approximately shortest line, and any pebbles lying in this plane will themselves be split, for the reasons above given. Fracture cannot therefore result in cleavage between pebbles and concrete, and pebbles on said line will not protrude from the otherwise smooth face of the fracture. This feature is of great importance and adds greatly to the value of the finished product, and one which has not to my knowledge been attained heretofore. These split pebbles in the actual plane of fracture of the block present faces that are entirely clean and free from any cement or other foreign material. Second, it is to be observed that many different designs can be produced by the opportunity afforded by this condition. By inserting different kinds and in natural colors of granite or marble, and other kinds of pebbles of different sizes, if desired, or in mixtures of various kinds of these materials, many different face designs and effects are possible and contemplated.

While for the reasons given above I have been able to quite positively direct the line of fracture where desired without especial provision of means for the purpose, I may direct this line still more certainly by further weakening the block at the point intended by molding it with a groove on either side, and this is shown in Fig. 2 by providing the inner faces of the side plates of the mold with strips of the shape in cross section which is the counterpart of the groove desired. The strips 14 in said view are wedge-shaped and triangular producing thereby a triangular-shaped groove in the molded block. This groove 15 serves further to receive and guide the tool for splitting, if it is used for the purpose.

A preferred manner of fracturing the composite block is to direct a sharp tool 16 somewhat wider than the usual chisel at right angles to the side face of the block and against the granite layer thereof, inserting its edge in the groove, if such is provided, and striking its handle 17 a sharp blow when the block will be broken readily and on a plane quite level and smooth. In the view shown in Fig. 3, the block while being broken is supported on a block 18, but this particular form of support is not essential.

The result of this fracture is a block shown in Fig. 1 as a block of two materials, the rear portion 10 being of concrete only and the face 19 designed to form the surface of the finished wall having a granite face with split pebbles 12 appearing over its surface and affording a rock face that reflects the light rays at varying angles and thus presenting a sparkling and jewelled appearance which is highly ornamental. The groove 15 having been divided by the block fracture, the final block will have a beveled edge as designated by 20.

By making the strips 14 of other shapes including ornamental curves, the edges 20 may be changed to corresponding curved edges as 21 and 23 in Figs. 5 and 6. These views also show some of the many designs possible by laying finished blocks above each other with two such curved edges together, giving the ornamental effect shown at 22 and 24.

Summarizing some of the conditions in related layers and parts of the block to be manufactured, it may be again stated that the pebble facing material 11 must be rich enough in cement so that when properly compacted into blocks and "set," the voids between the pebble bodies which are filled with cement will be stronger and tougher than the pebbles themselves, so that in the method of manufacturing, the plane of fracture, by following the line of least resistance, will go right through the pebbles and not around them, and thus show up the beautiful clean fractures through the pebbles.

Further, the concrete material 10 other than that containing the facing pebbles, being the major portion of the block, will be of still richer cement contents than the facing material 11, so that when the block is fully cured, the former will be stronger and tougher than 11 and thereby prevent the line of fracture from going outside of the layer 11 containing the pebble bodies bound therein.

Observance of these conditions and acting in conformity with the same, will always avoid any difficulty in controlling the line of fracture where it is desired. The grooves 15 assist in this function, but are not wholly essential.

The frames A may be removed from the molded blocks soon after filling with the material, though this is more or less a matter of choice, but the blocks are then allowed to set for some time—until fully ripened. No exact period is stated, though it has been found quite suitable to let them mature for a month, or even longer, before fracturing.

Other slight changes may be made in the method of making the blocks here described. For example, but two layers of different material may be used, as in Fig. 7 I have shown a layer of ordinary concrete 10 and an outer layer 11, the latter having protuberances 27 which are chipped off after maturing, the fracture plane 26 splitting through the pebbles 12 as in the other forms. This outer layer 11 may be molded on the ends as well as the side, as this view shows.

Figure 8:
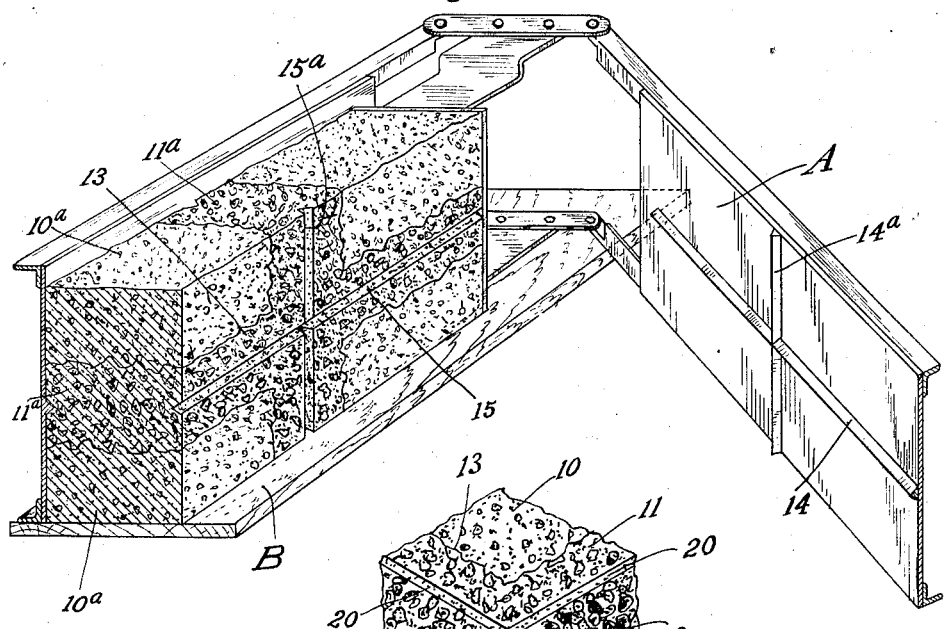
Figure 8 is a perspective of a further modified application of my general method of manufacture.
Figure 9:
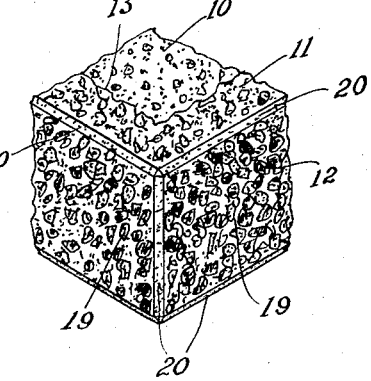
Figure 9 is a perspective of a corner block made by my new method.

In some cases it may be desirable to make corner blocks by molding four portions $10^a$ of the concrete and a cross-like inner portion of the granite layers $11^a$, using if desired, the bevels 14 and $14^a$ to produce the grooves 15 and $15^a$ whereby cross fractures may be effected after maturing, splitting the intervening pebbles as in the other forms, but making four blocks in this case. Fig. 8 shows the molding step, and Fig. 9 the corner perspective of one block after fracture in which 19 designates the faces and 20 the bevels, as in the other forms.

Neither do I limit myself to the exact materials specified, but include within the terms named all other compositions that may well fall within the generic scope of the terms and phrases employed.

I claim,—

1. The method of making artificial building blocks, comprising molding in an integral mass rich concrete material having imbedded therein brittle bodies of material contrasting with their surrounding concrete, allowing the block to fully harden, then fracturing the same transversely of its face, said line of fracture splitting the bodies which it intersects.

2. The method of making artificial building blocks comprising, molding in an integral mass rich concrete material having imbedded therein bodies of material contrasting with their surrounding concrete, allowing the block to harden fully, then fracturing the same transversely of its face by tapping the side face thereof by a sharp tool, said line of fracture splitting the bodies which it intersects.

3. The method of making artificial hardened blocks for building purposes, comprising molding in a unitary mass rich concrete material having imbedded therein pebbles of granite material and having grooves in its outer faces, permitting the block to fully cure in its original molded condition, then fracturing the same on a transverse plane connecting the said external grooves, whereby two blocks are formed each having on one face a broken surface with split pebbles thereon.

4. The method of making artificial hardened blocks for building purposes, comprising molding in a unitary mass rich concrete material having imbedded therein pebbles of granite material having weaker cohesive force than the adhesive force between the pebbles and the surrounding concrete material, allowing the entire material to thoroughly dry and harden, then fracturing the same on a plane transverse thereof and intersecting certain of said pebbles, thereby forming two blocks of which the fractured surfaces constitute the faces with split pebbles thereon.

5. The method of making artificial hardened blocks for building purposes, comprising molding in a unitary mass rich concrete material having imbedded therein pebbles of granite material and having grooves in its outer faces, permitting the block to fully cure in its original molded condition, then fracturing the same on a transverse plane connecting the said external grooves by tapping the line of one of the said grooves with a sharp tool, whereby two blocks are formed each having on one face a broken surface with split pebbles thereon.

6. The method of making artificial building blocks, comprising molding in an integral mass earthy material, bonding by cement therein bodies contrasting with their surrounding binder and having weaker cohesive force than the adhesive force between said bodies and the surrounding cement material, permitting the block to fully harden, then fracturing the same transversely through the block thereby splitting the bodies which the fracture plane intersects.

7. The method of making artificial hardened blocks for building purposes, comprising molding in a unitary mass concrete material having imbedded therein pebbles of granite, permitting the block to fully harden, then fracturing the same on a transverse plane through the block, whereby two blocks are formed each having on one face a broken surface with split pebbles thereon.

8. The method of making artificial hardened blocks for building purposes, comprising molding in a unitary mass rich concrete material having imbedded therein pebbles of granite material having weaker cohesive force than the adhesive force between the pebbles and the surrounding concrete material, allowing the entire material to thoroughly dry and harden, then fracturing the same on a plane transverse thereof and intersecting certain of said pebbles, thereby forming at least one block of which one or more fractured surfaces constitute faces with split pebbles thereon.

9. The method of making artificial hardened blocks for building purposes, comprising molding in a unitary mass a layer of rich concrete material and an adjacent layer of concrete material having imbedded therein pebbles of granite material, permitting the composite block to fully harden, then fracturing the same transversely through said adjacent layer thereby splitting the pebbles which the plane of fracture intersects.

10. The method of making artificial hardened blocks for building purposes, comprising molding in a unitary mass outer layers of rich concrete material and an intermediate layer of concrete material having imbedded therein pebbles of granite material, permitting the composite block to fully harden, then fracturing the same transversely through said intermediate layer thereby splitting the pebbles which the plane of fracture intersects.

11. The method of making artificial building blocks, comprising molding in an integral mass outer layers of rich concrete material and an intermediate layer of concrete material having imbedded therein bodies of material contrasting with their surrounding bonding concrete, permitting the composite block to fully harden, then fracturing the same transversely of said intermediate layer, said line of fracture splitting the bodies which it intersects.

12. The method of making artificial building blocks, comprising molding in an integral mass outer layers of rich concrete material and an intermediate layer of concrete material having imbedded therein bodies of material contrasting with their surrounding bonding concrete, permitting the composite block to fully harden, then fracturing the same transversely of said intermediate layer, by tapping the side face thereof by a sharp tool, said line of fracture splitting the bodies which it intersects.

13. The method of making artificial hardened blocks for building purposes, comprising molding in a unitary mass outer layers of rich concrete material and an intermediate layer of concrete material having imbedded therein pebbles of granite material, permitting the composite block to fully mature or harden, then fracturing the same on a transverse plane through the intermediate layer and midway between said outer layers, whereby two blocks are formed each having on one face a broken surface with split pebbles thereon.

14. The method of making artificial building blocks, comprising molding in an integral mass an intermediate layer of earthy material bonding by cement therein bodies contrasting with their surrounding binder and having weaker cohesive force than the adhesive force between said bodies and the surrounding cement material, and outer layers of earthy material richer in cement than the intermediate layer, permitting the composite block to fully harden, then fracturing the same transversely through said intermediate layer thereby splitting the bodies which the line of fracture intersects.

15. The method of making artificial building blocks, comprising molding in a unitary mass outer layers of rich concrete material and an intermediate layer of concrete material having imbedded therein pebbles of granite material and having grooves in its outer faces midway between the said outer layers of concrete, permitting the composite block to fully cure in its original molded condition, then fracturing the same on a transverse plane connecting the said external grooves, whereby two blocks are formed each having on one face a broken surface with split pebbles thereon.

16. The method of making artificial building blocks, comprising molding in an integral mass an intermediate layer of concrete material bonding therein bodies of material contrasting with their surrounding binder and having weaker cohesive force than the adhesive force between said bodies and the surrounding concrete, and outer layers of concrete material richer in cement than the intermediate layer, permitting the composite block to fully harden, then fracturing the same transversely through said intermediate layer thereby splitting the bodies which the plane of fracture intersects.

17. A concrete building block having on one face thereof a surface of concrete material having bonded therein pebbles split in the plane of said surface.

18. A concrete building block having for a wall face a surface in which appear spaced pebbles split in the plane of said surface.

19. A concrete building block having on one face a surface in which appear spaced pebble bodies of granite split in the plane of said surface.

20. A concrete building block having a rear portion formed of concrete material, and a front portion formed of concrete material mixed with granite bodies, said latter portion having a face presenting a fractured surface in which appear spaced pebble bodies split in the plane of said surface fracture.

In testimony whereof I hereunto affix my signature.

HERMAN BESSER.